United States Patent [19]
Gjessing et al.

[11] Patent Number: 6,070,461
[45] Date of Patent: Jun. 6, 2000

[54] SYSTEM FOR DETECTION AND MEASUREMENT OF ATMOSPHERIC MOVEMENT

[75] Inventors: Dag T. Gjessing, Skedsmokorset; Jens Hjelmstad, Lillestrøm; Andreas Tonning, Trondheim, all of Norway

[73] Assignee: Triad A/S, Lillestrøm, Norway

[21] Appl. No.: 08/945,012

[22] PCT Filed: May 23, 1996

[86] PCT No.: PCT/NO96/00128

§ 371 Date: Oct. 16, 1997

§ 102(e) Date: Oct. 16, 1997

[87] PCT Pub. No.: WO96/37790

PCT Pub. Date: Nov. 28, 1996

[30] Foreign Application Priority Data

May 24, 1995 [NO] Norway .................................... 952071

[51] Int. Cl.[7] .................................................. G01F 13/00
[52] U.S. Cl. .......................................................... 73/170.15
[58] Field of Search ................................ 73/170.15, 189; 342/26

[56] References Cited

U.S. PATENT DOCUMENTS

| | | |
|---|---|---|
| 4,206,639 | 6/1980 | Balser . |
| 4,222,265 | 9/1980 | Ravussin . |
| 4,351,188 | 9/1982 | Fukushima et al. . |
| 4,761,650 | 8/1988 | Masuda et al. . |
| 5,017,923 | 5/1991 | Nemit . |
| 5,122,805 | 6/1992 | Peterman et al. . |
| 5,208,600 | 5/1993 | Rubin . |

FOREIGN PATENT DOCUMENTS

| | | |
|---|---|---|
| 3739094 | 5/1989 | Germany . |
| 1122986 | 11/1984 | U.S.S.R. . |
| 1178209 | 2/1993 | U.S.S.R. . |

*Primary Examiner*—Harshad Patel
*Assistant Examiner*—Jewel V. Thompson
*Attorney, Agent, or Firm*—Rothwell, Figg, Ernst & Kurz

[57] ABSTRACT

A system for the detection and measurement of atmospheric air movement irregularities such as wind velocity vector, wind shear, downdraft, clear air turbulence, aircraft induced vorteces and turbulence, in particular along a glidepath near airports, whereby an air volume under investigation is illuminated by a radio wave transmitter with a beam of coherent electromagnetic energy and a resulting wave field is received and processed in processor means to derive information on the existence of said atmospheric irregularities and furthermore to give specific measurements of related parameters, comprising at least one receiver for said resulting wave field, which is due to scattering in said air volume, positioned at a bistatic location having a selected distance from said transmitter, characterized by acoustic transmitter means located between said transmitter and said at least one receiver, and adapted to emit acoustic waves into said air volume, with frequency and beamwidth of the acoustic waves chosen such that a resulting disturbance of the dielectric constant of air in said air volume, contributes to said scattering.

15 Claims, 4 Drawing Sheets

6,070,461

SYSTEM FOR DETECTION AND MEASUREMENT OF ATMOSPHERIC MOVEMENT

BACKGROUND OF THE INVENTION

This invention relates to a system for measuring and detecting of velocity, turbulence, vorteces and similar irregularities and phenomena in air, including classification of such phenomena. These may comprise the wind velocity, clear air turbulence as well as aircraft induced vortices and turbulence. Detection and measurement as contemplated takes place by combining electromagnetic and acoustic waves.

The invention comprises a system of transmitter and receiver means for electromagnetic waves and transmitter means for acoustic waves, as well as an associated method.

The invention is primarily directed to the measurement of the mentioned phenomena affecting air traffic safety, but may easily be adapted to other fields of use.

This kind of phenomena have been measured before by measuring the scattering and Doppler-shift of electromagnetic beams when affected by the disturbances in the air. An example of this is given in the international patent application WO 93/19383 using electromagnetic transmitter and receiver means. The electromagnetic beam is transmitted at a microwave frequency and is scattered by disturbances in the air. The receiver means are positioned at a bistatic location and directed so as to cover a volume of air also covered by the transmitter, and to receive signals with a (preferrably low) scattering angle.

Scattering of electromagnetic waves by acoustic waves is discussed in Appl. Sci. Res. Section B, Vol. 6, 1957 by A. Tonning: "Scattering of electromagnetic waves by an acoustic disturbance in the atmosphere". The publication discusses the cases of spherical and plane acoustic waves.

This invention is based on the fact that acoustic waves generate disturbances in the dielectric constant in the air by changing its density. These disturbances are affected by wind and other phenomena in the air, and also scatter the electromagnetic energy. By controlling the acoustic signal and/or the electromagnetic energy the scattering may be controlled, and the received signal may then be use to measure the other disturbances in the air. A system similar to this is described in U.S. Pat. No. 4,351,188 in which radio waves are transmitted towards a spherical acoustic wavefront. The electromagnetic wave is reflected and focused by the acoustic wavefront towards electromagnetic receivers on the ground. A two-dimensional array of receivers is used to measure the position to which the electromagnetic wave is focused. This position and the time delay give an indication of the wind velocity at a given altitude. A disadvantage in this system is the limitations in the wind directions that can be measured. To get a reflection focused inside the receiver array the wind must blow along the direction from the electromagnetic transmitter, across the acoustic transmitter towards the electromagnetic receivers. To get a complete wind profile four electromagnetic and acoustic transmitters are used. Another disadvantage with this solution is that the transmitters and receivers need to be positioned close to each other, which limits the possibility for using existing components at the site in which the measuring is to be performed.

The present invention avoids this problem by generating a grating in the dielectric constant of the air and measuring the fluctuations and movements of this grating to get a complete wind profile in a chosen air volume. The novel and specific features according to the invention are set out more completely in the claims.

According to the invention the acoustic signal is essentially periodic. This will generate a generally periodic disturbance in the dielectric constant of the air. In this way a grating may be generated, moving at the speed of sound, with a spatial wavelength depending on the wavelength (and thereby frequency) of the acoustic energy. The grating will satisfy the Bragg conditions for certain combinations of acoustic and electromagnetic frequencies and thereby reflect part of the electromagnetic energy towards the receivers.

The different movements in the air will affect the grating in different ways. Air moving parallel to the direction of propagating acoustic energy will change the density of the grating, and air moving perpendicular to the acoustic energy will displace the grating. By measuring parameters like the acoustic or electromagnetic frequencies, or displacement or angle of arrival of the received electromagnetic wavefronts the air velocity and direction may be found.

BRIEF DESCRIPTION OF THE DRAWINGS

The invention as well as the resulting advantages will be explained more in detail in the following description, referring also to the drawings in which.

DETAILED DESCRIPTION OF THE PREFERRED EMBODIMENTS

Figure 1:
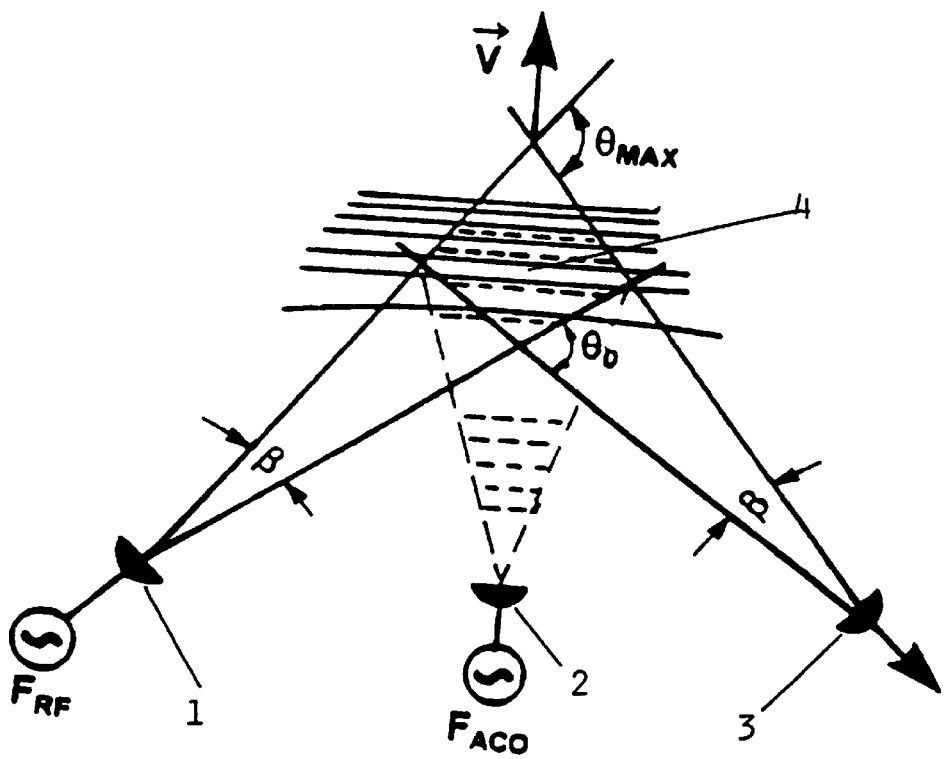
FIG. 1 schematically illustrates a system according to the invention, with electromagnetic and acoustic transmitters, and receiver means for electromagnetic energy.

FIG. 1 illustrates the general setup of the invention, with a transmitter 1 for electromagnetic waves, transmitter means 2 for emitting acoustic waves, receiver means 3 for receiving the scattered electromagnetic waves. The receiver and transmitter means all point towards the same volume of air 4.

The electromagnetic waves are sent in the direction of the selected volume of air 4, where they interact with the acoustic waves preferrably making a grating which, by Bragg reflection, reflects at least part of the electromagnetic energy towards the receiver(s) 3.

Typically the elevation angles of the electromagnetic transmitter 1 and receiver(s) 3 is smaller than illustrated in the figure. The distance between the electromagnetic 1 and acoustic 2 transmitters is preferrably essentially similar to the distance between the acoustic transmitter 2 and the receiver(s) 3, and the elevation of acoustic transmitter(s) 2 is close to 90°. Ideally the beams from the transmitters 1,2 and the coverage of the receiver(s) span essentially in the same plane.

The grating generated by the acoustic transmitter essentially consists of surfaces having different dielectric properties. According to this invention the electromagnetic waves meets this grating at a relatively small angle and is partially reflected at each surface. If the frequencies of the waves are chosen according to the invention to satisfy the Bragg conditions the reflected electromagnetic beams reflected from each surface interfere with each other making an interference pattern with a main reflection towards the receivers. To obtain this the distance between the acoustic transmitter and the air volume to be measured is preferably less than the distance between the electromagnetic and the acoustic transmitters.

In a first embodiment of the invention a change in the density of the grating due to movement in the air changes the condition for reflection, and the signal is lost from the receiver 3. This change is compensated for by varying the emitted acoustic frequency until the electromagnetic signal is again received by the receiver. The air velocity corresponding to this change in frequency is found by studying the equation describing the Bragg conditions:

$$F_{aco} = 2F_{rf}\frac{c_{aco}}{c_{rf}}\sin\frac{\theta}{2} \tag{1}$$

where $F_{aco}$ is the acoustic frequency, $F_{rf}$ is the electromagnetic frequency, $c_{aco}$ is the speed of sound, $c_{rf}$ is the speed of light, and $\theta$ is the angle between the transmitted and the reflected electromagnetic beam.

With wind affecting the grating we have:

$$F_{aco} = 2\frac{F_{rf}}{c_{rf}}(c_{aco} + V)\sin\frac{\theta}{2} \tag{2}$$

where V is that component of velocity of the air in the acoustic propagation direction.

The electromagnetic beam has a beamwidth $\beta$, and the receiver covers an angle of about the same size. Together they select a specific volume of air 4 to be measured. Since the electromagnetic energy is reflected within this volume the angles of reflection are limited by the maximum $\theta_{max}$ and minimum $\theta_O$ angles between the transmitted and received electromagnetic waves. This in turn limits the range acoustic frequencies usable.

Figure 2A:
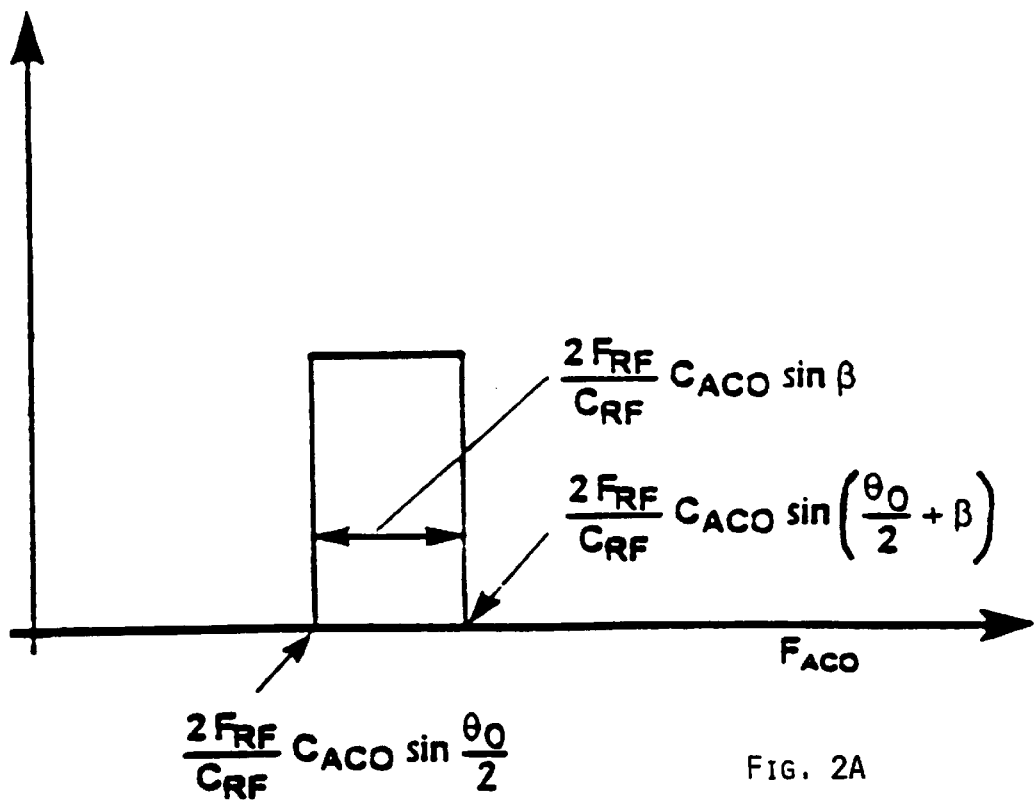
FIG. 2a illustrates the acoustic frequency range satisfying the Bragg conditions in a no wind situation.

In order to measure wind moving parallel to the acoustic energy, by the use of the coupling of electromagnetic and acoustic waves, the atmospheric volume illuminated by the RF transmitter and seen by the RF receiver should be modulated by acoustic waves in the frequency range from $$(F_{aco})_{min} = 2\frac{F_{rf}}{c_{rf}}c_{aco}\sin\frac{\theta_0}{2} \tag{3}$$

$$(F_{aco})_{max} = 2\frac{F_{rf}}{c_{rf}}(c_{aco} + V)\sin\left(\frac{\theta_0}{2} + \beta\right) \tag{4}$$

where $\theta_O$ is the minimum angle between the electromagnetic beam, and the sector covered by the receiver as shown in FIG. 1. FIG. 2a illustrates the range of acoustic freqencies giving reflection when no wind is present.

The difference in acoustic frequency due to the change in the grating caused by the wind may then be expressed as:

$$\Delta F_{aco} = 2\frac{F_{rf}}{c_{rf}}V\sin\left(\frac{\theta_0}{2} + \beta\right) \tag{5}$$

Figure 2B:
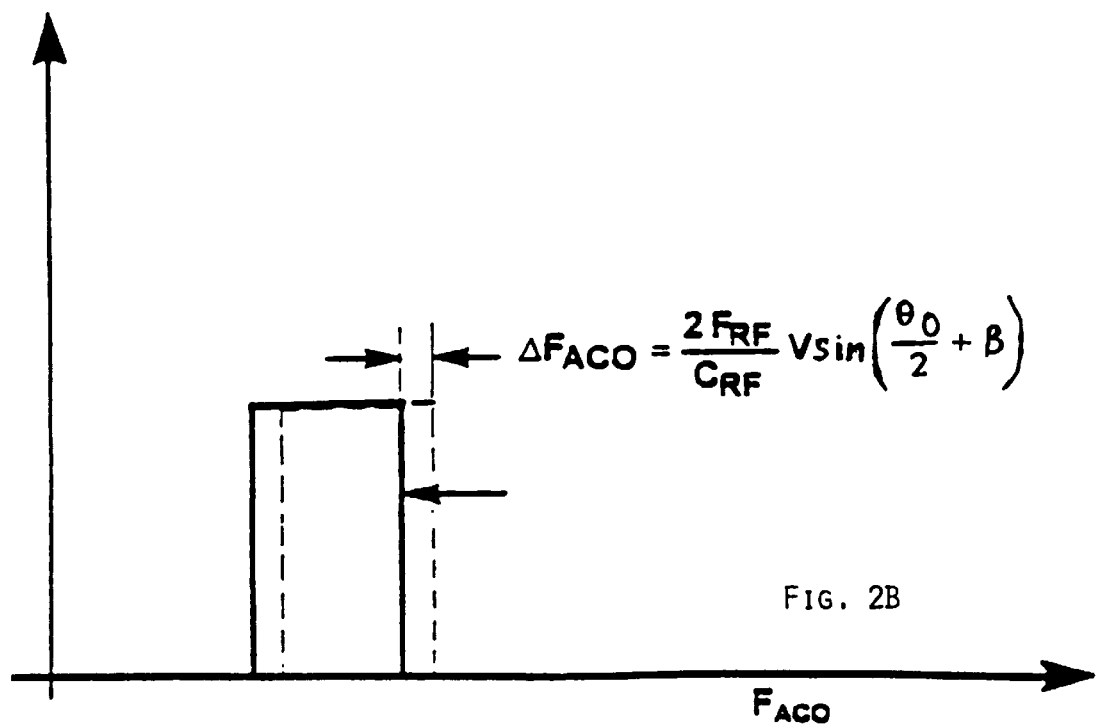
FIG. 2b illustrates the shift in the acoustic frequency satisfying the Bragg conditions when the grating is influenced by wind parallel to the acoustic beam.

This shift in acoustic frequency is illustrated in FIG. 2b.

By emitting acoustic "chirps", preferrably starting at the highest frequency, and correlating the received signal with the emitted acoustic signal, the wind velocity at a specific height may be found. By integrating this over the frequencies of the acoustic signal the wind as a function of height may be found. A similar method may be used by varying the electromagnetic frequency.

The change in the grating may of course also be measured by detecting the change in angle by which the electromagnetic energy is received. Using receiver means being able to detect the angle of arrival of the electromagnetic energy will then be another possible variant within the scope of the invention.

Figure 3:
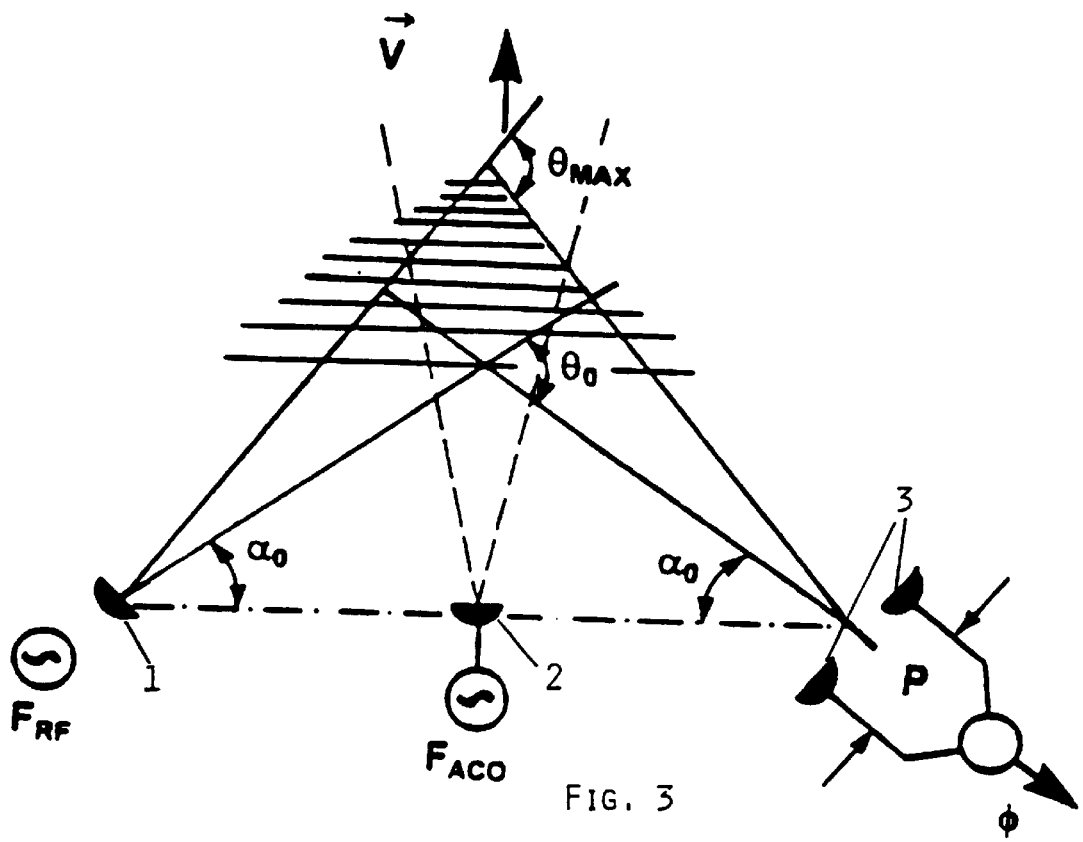
FIG. 3 shows the system and method of invention using two receivers to detect the angle of arrival of the electromagnetic beam.

Consider, as illustrated in FIG. 3, a case where the acoustic frequency for zero wind is matched with a RF frequency for scattering angle $\theta_O = 2\alpha_O$. This requires an acoustic frequency given by $$F_{aco} = 2\frac{F_{rf}}{c_{rf}}c_{aco}\sin\frac{\theta_0}{2} \tag{6}$$

If we have a wind velocity V for a fixed acoustic frequency, the matching scattering angle becomes $$F_{aco} = 2\frac{F_{rf}}{c_{rf}}(c_{aco} + V)\sin\frac{\theta_0}{2} \tag{7}$$

and from these equations the change in angle of arrival is found to be $$\Delta\alpha = \sin^{-1}\left(\frac{c_{aco}\sin\frac{\theta_0}{2}}{c_{aco} + V}\right) - \frac{\theta_0}{2} \tag{8}$$

The angle of arrival may be measured by measuring the difference in phase of the output of two receiving antennas and using this in the following equation:

$$\Delta\theta = \frac{c}{FD}\frac{\Delta\phi}{360} \tag{9}$$

where $\Delta\theta = 2\Delta\alpha$, F is the radio frequency, D is the antenna spacing, $\Delta\phi$ is the phase resolution and c is the phase velocity of the radio wave.

Figure 4:
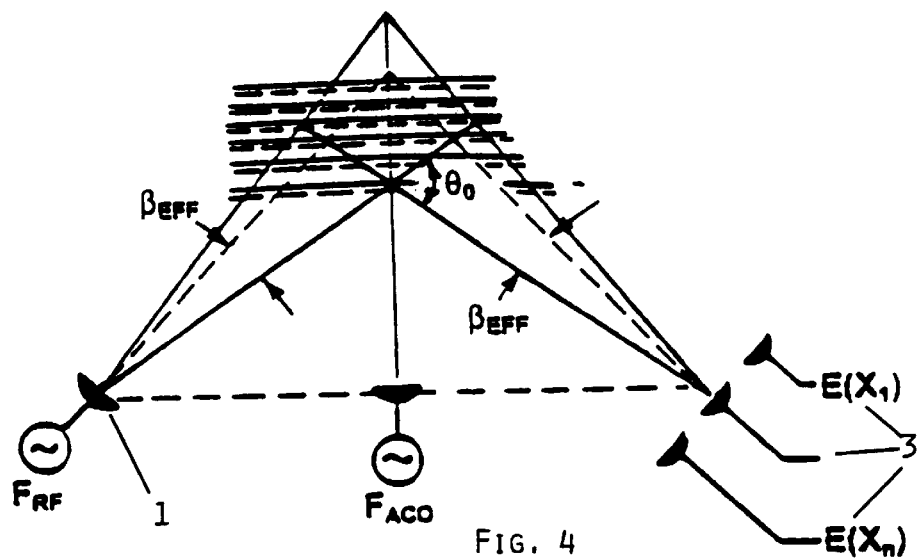
FIG. 4 shows the system/method invention using at least 3 receivers to measure the shape of the received wavefront.

FIG. 4 illustrates an embodiment of the invention for measuring shape of the received wavefront by using three or more receivers positioned in a vertical array. An electromagnetic wave is scattered towards the receiver at the scattering angle $\theta_O$, and a wave scattered at the angle $\theta_O + \Delta\theta_c$ is anti-matched with the first, which means that the wavenumber in the second case is changed by a factor 2. This may be expressed as:

$$\frac{4\pi}{\lambda}\sin\frac{\theta_0}{2} = \frac{1}{2}\frac{4\pi}{\lambda}\sin\frac{\theta_0 + \Delta\theta_c}{2} \tag{10}$$

Thus the difference in scattering angle required for destructive coupling is:

$$\Delta\theta_c = 2\sin^{-1}\left(2\sin\frac{\theta_0}{2}\right) - \theta_0 \quad (11)$$

Using equation (8) and the fact that $\Delta\theta_{OV}=2\Delta\alpha_{OV}+\theta_O$ is the minimum angle of arrival with a vertical wind velocity V we find that:

$$\Delta\theta_{OV} = 2\sin^{-1}\left(\frac{c_{aco}\sin\frac{\theta_0}{2}}{c_{aco}+V}\right) \quad (12)$$

Substituting $\theta_{OV}$ for $\theta_O$ in equation (11) gives the width of the angle of arrival spectrum as a funtion of wind velocity.

The spatial correlation of the field strength at the receiver is the Fourier transform of the angular power spectrum. Assuming that this may be expressed as a sinc function, the spatial autocorrelation of the field strength is a rectangular function, the width L of which is given as:

$$\beta_{EFF} = \frac{\lambda_{rf}}{L} = \frac{1}{2}\Delta\theta_c \quad (13)$$

$$\frac{L}{\lambda_{rf}} = \frac{2}{\Delta\theta_c} \quad (14)$$

From the equations above the vertical correlation distance may be measured in wavelength as a function of vertical wind velocity.

Figure 5:
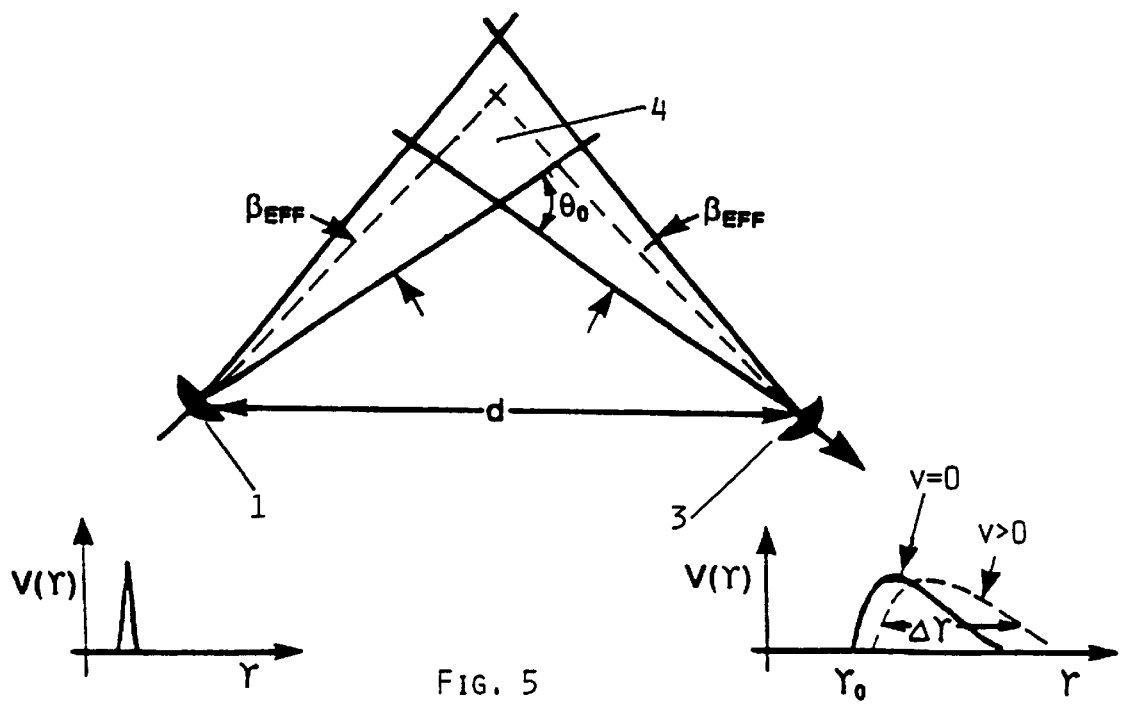
FIG. 5 illustrates the geometry in measuring the time delay of the electromagnetic signal.

Measuring the time delay of the transmitted signal and thereby the distance of travel to find the wind velocity is another technique within the scope of this invention. Referring to FIG. 5 we find the following relationship:

$$\theta = 2\left[\left(\frac{1}{d}\right)^2 - 1\right]^{\frac{1}{2}} \quad (15)$$

where d is the distance between the transmitter and the receiver and l is the length of the path of the electromagnetic energy.

Knowing that the delay time $\tau$ may be expressed as $\tau_O=l_O/c$ we get the following equation for the minimum time delay:

$$\tau_0 = \frac{d}{c}\left[\left(\frac{\theta_0}{2}\right)^2 + 1\right]^{\frac{1}{2}} \quad (16)$$

From equation (8) we know that an increase in wind gives an increase in scattering angle. The corresponding increase in time delay may then be expressed as:

$$(\Delta\tau)_w = \frac{d}{c}\left[\left(\frac{\Delta\theta_w}{2}\right)^2 + 1\right]^{\frac{1}{2}} - \frac{d}{c}\left[\left(\frac{\theta_0}{2}\right)^2 + 1\right]^{\frac{1}{2}} \quad (17)$$

where $\Delta\theta_w$ may be found from equation 8, since $\Delta\theta_w=2\Delta\alpha+\theta_O$.

It may also be of interest to calculate the broadening $$\Delta\tau = \frac{d}{2c}(\theta\beta_{EFF} + \beta_{EFF}^2) \quad (18)$$

of the delay spectrum. This is given by: where $\beta_{EFF}$ is the effective beamwidth of the electromagnetic beam. This scintillation bandwidth and the spectral shape og the received electromagnetic beam indicates the amount distortion in the acoustic grating. This indicates the degree of turbulence and other small scale disturbances in the air affecting the acoustic beam from the transmitter upwards to the interaction area. By varying the acoustic and electromagnetic frequencies selectively it is possible to make a profile of the turbulence from the acoustic transmitter to a selected height.

Figure 6:
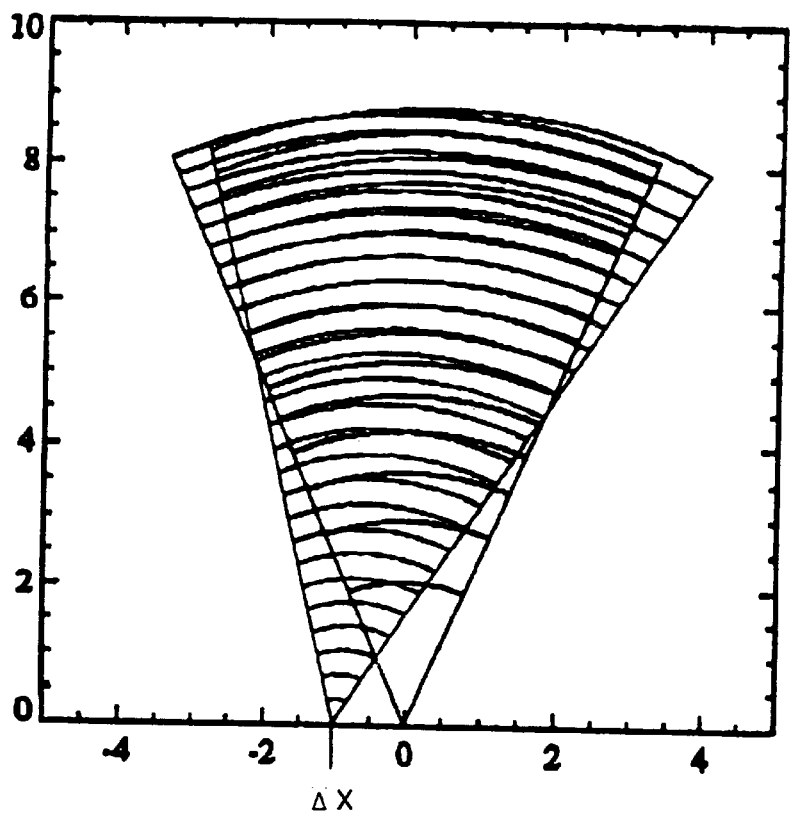
FIG. 6 illustrates the displacement of the grating due to wind moving perpendicular to the acoustic beam.

Air movements essentially perpendicular to both the acoustic and the electromagnetic beam may also be measured with this invention. The grating will be affected by the air movements by shifting sidewards and will behave like the acoustic source was moved, as seen in FIG. 6, a distance $\Delta x$ horisontally where $$\Delta x = H\frac{V_x}{c_{aco}} \quad (19)$$

and H is the height at which the measurement is taken.

Figure 7:
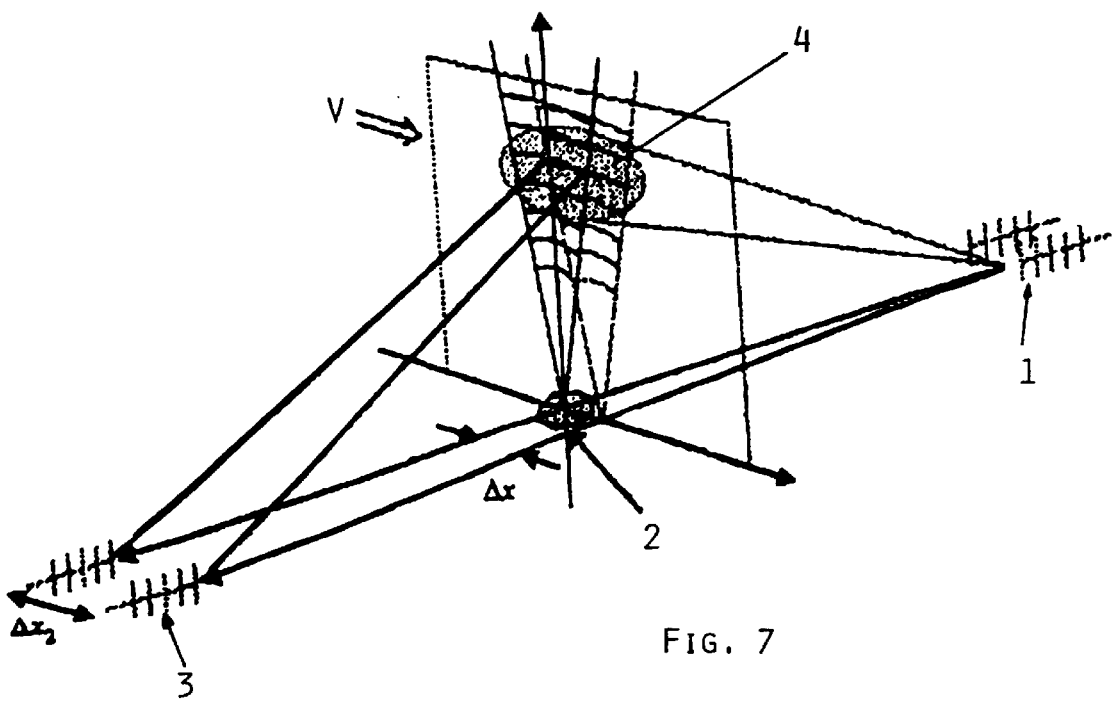
FIG. 7 shows a complete setup for measuring wind moving across the acoustic beam, using more than one receiver to measure the displacement of the received beam.

The electromagnetic energy is reflected in a different direction, and may be received at a new location moved a distance $\Delta x_2$:

$$\Delta x_2 = \Delta x \frac{R_1 + R_2}{R_1} \quad (20)$$

where $R_1$ is the horisontal distance from the transmitter to the measuring area, and $R_2$ is the horisontal distance from this area to the receivers, as shown in FIG. 7. By using an array of acoustic transmitters and adjusting their frequency and/or phase until the electromagnetic energy is received by the receiver. This way the air movements perpendicular to the acoustic energy may be measured.

Alternatively an array of receivers may be used to measure the displacement of the received energy.

In case of a vertical gradient of the cross-wind the system will measure the integrated influence of the wind from height zero to the measured volume. If more than one acoustic frequency is used each frequency of the acoustic stimulation will measure at a height H such that it satisfy the Bragg condition. Thus by transmitting several acoustic frequencies in parallel and sequence information is retrieved on the horisontal wind profile.

In a similar way wind essentially parallel with the electromagnetic beam will move the grating a distance $\delta D$. This may be measured by observing the fact that if the acoustic waves use a time time t to reach a heigth $h_s$ satisfying the Bragg conditions in a no-wind situation, the waves will use more time to reach the same height if the grating is moved by the wind. This delay may be measured be measuring the phase of the acoustic signal in the scattering volume.

Geometrics give the following expression:

$$h_s = \frac{D}{2}\left(4\frac{F_{rf}/c_{rf}}{F_{aco}/c_{aco}} - 1\right)^{-\frac{1}{2}} \quad (21)$$

For a homogeneous wind profile the scattering volume has been shifted a distance $$\delta D = hs\frac{V_y}{c_a} = \frac{D}{2}\frac{V_y}{c_a}\left(4\frac{F_{rf}/c_{rf}}{F_{aco}/c_{aco}} - 1\right)^{-\frac{1}{2}} \quad (22)$$

where $c_a$ is the mean horisontal wind from the ground to the scattering volume.

The distance travelled by the acoustic signal is $$h_v = \sqrt{h_s^2 + \delta D^2} \quad (23)$$

and the acoustic phase $\phi = K_{aco}h_v$, where $K_{aco}$ is the wavenumber. Using this and equation 21 and 22 the equation for finding the phase of the acoustic signal is:

$$\varphi_{aco} = \frac{\pi F_{aco}D}{c_{aco} + V_y}\sqrt{\frac{1 + \left(\frac{V_y}{c_{aco} + V_y}\right)^2}{4\left(\frac{F_{rf}}{F_{aco}}\frac{c_{aco} + V_y}{c_{rf}}\right)^2 - 1}}$$

From this equation the horizontal wind velocity $V_y$ may be found by measuring the phase of the scattering acoustic waves.

To measure the acoustic phase the electromagnetic receiver receiver means may be syncronized with the acoustic source.

The speed of sound being a factor in many of the above mentioned equations, is dependent on the temperature in the air. It may therefore be necessary to measure the temperature in the air above the acoustic transmitter. This is preferably done using standard RASS technology measuring acoustic signal scattered back towards the acoustic transmitter.

A possible problem in receiving the electromagnetic signal is to eliminate noise from transmitted electromagnetic signals that have not been scattered in the mentioned air volume. This may be electromagnetic waves received directly from the transmitter, or waves scattered by other process. To avoid this the receiver may be phaselocked to the transmitted electromagnetic frequency minus the transmitted acoustic frequency.

By using more than one electromagnetic frequency simultaneously spatial information may be retreived. If the information, such as frequency or phase, in the emitted electromagnetic beam varies in the direction perpendicular to its direction of propation, it will be possible to identify the part of the beam reflected from the different parts of the measured volume. When using this invention in connection to air traffic control an already existing ILS transmitter may be employed.

Another possibility within the scope of this invention is the use of more than one set of electromagnetic transmitters and receivers, using the same acoustic transmitter(s) and measuring the same air volume from a different direction. This gives an abundance of data and more precise measurements. Using more than one electromagnetic and acoustic beams directed in different directions at the same time is also within the scope of the invention. If more than two acoustic transmitters are used in the system they may be positioned in groups separated with a distance larger than the distance between the transmitters within each group.

What is claimed is:

1. A system for detecting and measuring irregularities in atmospheric air movement, comprising:

a radio wave transmitter for irradiating an air volume under investigation with an electromagnetic beam of essentially coherent electromagnetic wave energy, which induces in said air volume a resulting wave field caused by scattering of said electromagnetic beam in said air volume;

at least one receiver, positioned at a selected distance from said radio wave transmitter, for receiving said resulting wave field and inputting said received resulting wave field to a processor for processing and measuring of irregularities in air movement; and an acoustic transmitter located between said radio wave transmitter and said at least one receiver, adapted to emit into said air volume acoustic waves having a frequency and beam width chosen to cause a disturbance in a dielectric constant of air in said air volume which contributes to said scattering, and causing said disturbance of said dielectric constant to form an essentially periodic grating that satisfies Bragg conditions for said electromagnetic beam and thereby reflects said electromagnetic beam in a direction of said at least one receiver;

wherein the distance between said acoustic transmitter and said air volume is smaller than the distance between said acoustic transmitter and said radio wave transmitter.

2. A system as set forth in claim 1, wherein said acoustic transmitter is located close to an axis between said radio wave transmitter and said at least one receiver, and wherein said electromagnetic beam, said acoustic beam and said resulting wave field generally define a plane.

3. A system as set forth in claim 1, wherein said frequency of said acoustic waves varies within a preselected range.

4. A system as set forth in claim 3, wherein said acoustic waves consist of frequency chirps, each starting at the highest frequency in said preselected range and including frequencies satisfying Bragg conditions at a range of height intervals.

5. A system as set forth in claim 1, wherein said acoustic transmitter includes at least two transmitters in a one- or two-dimensional array, each being capable of transmitting at different variable frequencies.

6. A system as set forth in claim 1, wherein said radio wave transmitter is adapted to emit electromagnetic waves at one or more variable frequencies, and wherein said at least one receiver is adapted to detect the frequency or frequencies of said resulting wave field.

7. A system as set forth in claim 6, wherein said radio wave transmitter is an ILS transmitter.

8. A system as set forth in claim 1, further including a second receiver adapted to detect frequency, phase and/or arrival angle of said resulting wave field, and thereby able to locate air movement being measured within said air volume.

9. A system as set forth in claim 8, further including a third receiver for measuring a shape of said resulting wave field, measuring a degree of small scale disturbance and turbulence of said air volume.

10. A system as set forth in claim 1, further comprising means for measuring propagation time of electromagnetic energy from said transmitter to said at least one receiver.

11. A system as set forth in claim 1, further comprising means for measuring spectral bandwidth and spectral shape of said resulting wave field at one or more frequencies so as to measure and classify turbulence and other disturbance between said acoustic transmitter and said air volume.

12. A system as set forth in claim 9, wherein said receivers are phase-locked to a frequency of said transmitted electromagnetic beam minus a frequency of said acoustic wave.

13. A system as set forth in claim 1, wherein said system further includes means for measuring wind components along the direction of said electromagnetic beam by measuring mean acoustic phase-shift of said acoustic waves caused by displacement of said air volume, and means for using said received resulting wave field to calculate wind velocity.

14. A method for measuring wind profile, comprising the steps of:

providing a radio wave transmitter for irradiating an air volume under investigation with an electromagnetic beam of essentially coherent electromagnetic wave energy, which induces in said air volume a resulting wave field caused by scattering of said electromagnetic beam in said air volume;

providing at least one receiver, positioned at a selected distance from said radio wave transmitter, for receiving said resulting wave field and inputting said received resulting wave field to a processor for processing and measuring of irregularities in air movement;

providing an acoustic transmitter located between said radio wave transmitter and said at least one receiver, adapted to emit into said air volume acoustic waves having a frequency and beam width chosen to cause a disturbance in a dielectric constant of air in said air volume which contributes to said scattering, and causing said disturbance of said dielectric constant to form an essentially periodic grating that satisfies Bragg conditions for said electromagnetic beam and thereby reflects said electromagnetic beam in a direction of said at least one receiver; and measuring air movements in said air volume having components parallel to propagating acoustic wave energy by one or more of the following techniques:
  i) measuring an angle of arrival of said resulting wave field as a function of emitted acoustic wave frequency,
  ii) detecting acoustic frequencies resulting in disturbance contributing to said scattering of electromagnetic energy toward said at least one receiver, and calculating velocities and height of air movements on the basis of detected acoustic frequencies and time distribution of emitted and received acoustic frequencies,
  iii) measuring time delay of scattered electromagnetic energy in said air volume as a function of acoustic frequency, and
  iv) measuring correlation distance of said resulting wave field and calculating vertical dimensions of said air volume.

15. A method for measuring wind profile, comprising the steps of:

providing a radio wave transmitter for irradiating an air volume under investigation with an electromagnetic beam of essentially coherent electromagnetic wave energy, which induces in said air volume a resulting wave field caused by scattering of said electromagnetic beam in said air volume;

providing at least one receiver, positioned at a selected distance from said radio wave transmitter, for receiving said resulting wave field and inputting said received resulting wave field to a processor for processing and measuring of irregularities in air movement;

providing an acoustic transmitter located between said radio wave transmitter and said at least one receiver, adapted to emit into said air volume acoustic waves having a frequency and beam width chosen to cause a disturbance in a dielectric constant of air in said air volume which contributes to said scattering, and causing said disturbance of said dielectric constant to form an essentially periodic grating that satisfies Bragg conditions for said electromagnetic beam and thereby reflects said electromagnetic beam in a direction of said at least one receiver; and measuring air movements in said air volume having components perpendicular to propagating acoustic wave energy by measuring displacement of said disturbance of said dielectric constant by one of the following techniques:
  i) measuring displacement of emitted acoustic waves by emitting different frequencies at different locations in an acoustic array and correlating angle of arrival of said resulting wave field with displaced acoustic frequency; and
  ii) measuring displacement of received resulting wave field as a function of angles of arrival and/or variable emitted acoustic frequencies.

* * * * *